(12) United States Patent
Bright

(10) Patent No.: US 10,684,146 B2
(45) Date of Patent: Jun. 16, 2020

(54) PARASITIC GAS DETECTION SYSTEM

(71) Applicant: IBALL INSTRUMENTS LLC, Norman, OK (US)

(72) Inventor: Carl Bright, Harrah, OK (US)

(73) Assignee: IBall Instruments LLC, Norman, OK (US)

( * ) Notice: Subject to any disclaimer, the term of this patent is extended or adjusted under 35 U.S.C. 154(b) by 713 days.

(21) Appl. No.: 14/827,832

(22) Filed: Aug. 17, 2015

(65) Prior Publication Data

US 2017/0052042 A1 Feb. 23, 2017

(51) Int. Cl.
*G01D 11/24* (2006.01)
(52) U.S. Cl.
CPC .................................. *G01D 11/245* (2013.01)
(58) Field of Classification Search
CPC .................................. G01N 9/00; G01N 30/28
See application file for complete search history.

(56) References Cited

U.S. PATENT DOCUMENTS

| | | | |
|---|---|---|---|
| 4,517,161 A | 5/1985 | Gravina et al. | |
| 5,363,690 A * | 11/1994 | Evangelista | G01N 33/0006 73/31.02 |
| 5,382,943 A * | 1/1995 | Tanaka | G08B 13/19619 340/500 |
| 5,469,369 A * | 11/1995 | Rose-Pehrsson | G01N 29/022 340/632 |
| 6,085,576 A * | 7/2000 | Sunshine | G01N 33/0031 340/634 |
| 6,266,998 B1 | 7/2001 | Hackenberg | |
| 6,375,828 B2 | 4/2002 | Ando et al. | |
| 6,728,643 B2 * | 4/2004 | Hackenberg | G01N 33/0031 204/424 |
| 6,996,478 B2 * | 2/2006 | Sunshine | B82Y 15/00 702/22 |
| 6,998,991 B1 | 2/2006 | Goldstein et al. | |
| 7,395,692 B2 | 7/2008 | Wansing | |
| 8,227,692 B2 | 7/2012 | Dahlgren et al. | |
| 8,437,966 B2 * | 5/2013 | Connolly | A61B 5/0002 702/32 |
| 8,771,597 B2 | 7/2014 | Zochbauer et al. | |
| 9,103,805 B2 * | 8/2015 | Gettings | G01N 33/0062 |
| 9,245,435 B2 * | 1/2016 | Boone | G08B 21/12 |
| 2002/0178789 A1 * | 12/2002 | Sunshine | G01N 29/022 73/31.06 |
| 2004/0173006 A1 * | 9/2004 | McCoy | G01M 3/225 73/40.7 |

(Continued)

FOREIGN PATENT DOCUMENTS

KR 101265788 B1 * 5/2013

*Primary Examiner* — Jamel E Williams
(74) *Attorney, Agent, or Firm* — Tyler J. Mantooth; Hall Estill Attorneys at Law

(57) ABSTRACT

A gas detection system that can parasitically utilize a mobile computing device to measure the presence and amount of gasses in a gas sample. The gas detection system can have a gas detection housing that has a local controller and at least one sensor. One or more mobile computing devices, which may be utilized as a remote controller, can be physically and electrically connected to the gas detection housing. The local controller can utilize a remote controller resident in the mobile computing device to detect one or more gasses in a gas sample with the at least one sensor.

18 Claims, 3 Drawing Sheets

(56) References Cited

U.S. PATENT DOCUMENTS

| | | |
|---|---|---|
| 2005/0186117 A1 | 8/2005 | Uchiyama et al. |
| 2009/0210169 A1* | 8/2009 | Potyrailo ............ G01N 33/1846 702/25 |
| 2012/0116241 A1* | 5/2012 | Shieh ..................... A61B 5/082 600/532 |
| 2012/0306656 A1* | 12/2012 | Boucher .............. H01H 33/563 340/638 |
| 2013/0192339 A1* | 8/2013 | Kriel ........................ G01N 1/22 73/23.36 |
| 2014/0165698 A1* | 6/2014 | Mochizuki ......... G01N 33/4972 73/23.3 |
| 2014/0208829 A1* | 7/2014 | Lechner ............... G01N 33/497 73/31.01 |
| 2014/0284222 A1* | 9/2014 | Wanek, Jr. ......... G01N 33/0065 205/780.5 |
| 2014/0349707 A1* | 11/2014 | Bang ....................... H04Q 9/00 455/556.1 |
| 2015/0136600 A1* | 5/2015 | Wu .................... G01N 33/0032 204/412 |
| 2015/0145685 A1* | 5/2015 | Albinger ............... H04W 76/50 340/632 |
| 2015/0177208 A1* | 6/2015 | Murphy ............. G01N 33/0073 235/375 |
| 2015/0268158 A1* | 9/2015 | Laudo ................ G01N 33/0047 250/349 |
| 2015/0323508 A1* | 11/2015 | Kriel ........................ G01N 1/22 73/23.36 |
| 2016/0223436 A1* | 8/2016 | Caruso ............... G01N 33/0016 |
| 2016/0261133 A1* | 9/2016 | Wang ...................... H02J 7/025 |
| 2016/0282853 A1* | 9/2016 | Michalscheck .......... G07C 3/00 |
| 2016/0284128 A1* | 9/2016 | Michalscheck ....... G06T 19/006 |

\* cited by examiner

PARASITIC GAS DETECTION SYSTEM

SUMMARY

A gas detection system, in accordance with assorted embodiments, has a gas detection housing with a local controller and at least one sensor. One or more mobile computing devices, which are utilized as a remote controller, are physically and electrically connected to the gas detection housing. The local controller utilizes the remote controller resident in the mobile computing device to detect one or more gasses in a gas sample with the at least one sensor.

DETAILED DESCRIPTION

Advancements in cellular technology has allowed for smaller, more powerful, and more energy efficient mobile communication devices. Advancements in gas detection technology has also allowed for smaller, more power efficient, and more accurate gas detection means. It is also advantageous to also have in certain hazardous environments and potential hazardous environments the ability to detect hazardous gasses and the levels of hazardous concentrations as well as the ability to manipulate data and communicate wirelessly to the world.

Generally, in many fields, a person or persons in these areas generally would have to carry both a cellular communications and data manipulation device for communications and data manipulation and also a personal safety gas monitoring device to monitor for the presence of and amounts of hazardous gasses.

The present disclosure generally relates to a device capable of detecting a single gas or multiple gasses using miniaturized single or plurality of gas detectors housed in a housing that will allow for physical and electronic parasitic attachment to a host mobile cellular telephone.

The parasitic device itself is (1) a plastic casing that houses; (2) the sensor or sensors that detect a hazardous gas or gasses, and (3) a control module that accepts sensory information from the sensor or sensors and interprets the signals and types and amounts of gas or gasses, and stores information relating to the gas or gasses detected, and communicates to the host cellular telephone through a wired or wireless electrical connection, and (4) has an integrated power supply system to run the sensor, sensors, and control module.

The parasitic devices plastic housing also acts as a mounting structure for the cellular telephone so that the electrical connections between the parasitic gas detector can be easily and physically attached to the cellular telephone.

The parasitic device plastic housing may also act as a sealed, water and gas tight, housing for protection of the cellular telephone host.

The parasitic device may also contain, but is not needed for operation, a fan or pump to draw atmospheric air or sample through the device for a more active detection of atmosphere or air sample. In this embodiment, the parasitic device may also have a pressure sensor to detect any occlusions and report the occlusion to the control module.

The parasitic device may also maintain a gas and water seal to protect the internal systems from harm from the hazardous environment.

Figure 1:
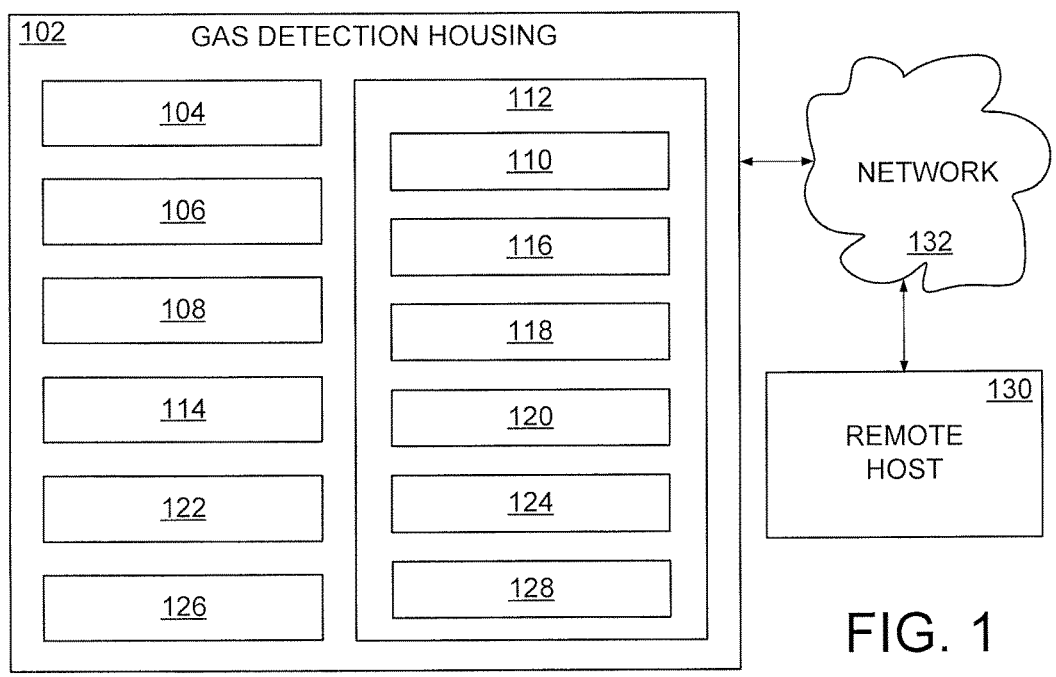
FIG. 1 displays a block representation of an example gas detection system that can detect the presence and amount of gasses in a gas sample.

Turning to the drawings, FIG. 1 is a block representation of an example gas detection system 100 arranged in accordance with various embodiments. The gas detection system 100 has a gas detection housing 102 that can concurrently, sequentially, and individually utilize a number of different sensors 104 to detect the presence and amount of predetermined gasses, such as, but not limited to, methane, butane, sulfur, sulfur dioxide, and oxygen. The gas detection housing 102 can communicate directly with a user via one or more user interface(s) 106, which may be a visual screen, lights, vibration, and/or tactile actions, to indicate information about particular gasses present around the sensors 104. That is, the user interface 106 may indicate gas information at a location distant from the user interface 106, as provided by the wired or wireless connections between the sensor 104 and a controller 108 of the gas detection housing 102.

In various embodiments, the gas detection housing 102 has at least one local controller 108, such as a microprocessor or application specific integrated circuit (ASIC), that communicates with a mobile controller 110 of a mobile computing device 112 that is connected to the gas detection housing 102 via an electrical interconnection 114. It is contemplated that the mobile computing device 112 is a smartphone, tablet computer, laptop computer, or smart watch that has the mobile controller 110 that directs operations in at least one screen 116, a mobile memory 118, such as a solid-state non-volatile memory or rotating data storage memory, and a communications circuit 120.

The mobile computing device 112 can be configured to selectively engage the interconnection 114 of the gas detection housing 102 to allow independent operation of the gas detection housing 102 and mobile computing device 112. For instance, the interconnection 114 may be a plug, dongle, holster, or cable that physically contacts the mobile computing device 112. As another non-limiting example, the interconnection 114 may consist of a wireless connection between the local 108 and mobile 110 controllers facilitated by the communications circuit 120 in conjunction with wireless transmittal and receiving capabilities of the interconnection 114.

By electrically interconnecting the gas detection housing 102 with the mobile computing device 112, the gas detection housing 102 can utilize various hardware, software, and processing capabilities of the mobile computing device 112 in a parasitic capacity. That is, while the gas detection housing 102 and mobile computing device 112 can operate independently and without any interconnection, the capabilities of the gas detection housing 102 can be increased and optimized by parasitically engaging features of the mobile computing device 112. As such, the local controller 108 can utilize the mobile controller 110 to increase computing power, the mobile memory 118 to temporarily or permanently store data to supplement a local memory 122, and the mobile power source 124 to complement the local power source 126.

The local controller 108, in some embodiments, can access portions of the mobile computing device 112 with or without permission in active or passive operations. For example, the local controller 108 may seek approval from a user or the mobile controller 110 to actively utilize a mobile sensor 128, such as a camera, thermometer, or online obtained content like humidity or geo-positional location. The local controller 108 may also passively utilize any portion of the mobile computing device 112 without alerting or seeking permission from a user.

The ability to utilize the gas detection housing 102 alone or in combination with the interconnected mobile computing device 112 allows a user to selectively adapt the gas detection system 100 to various conditions and situations. For instance, a user may be taking a quick gas detection reading and choose not to interconnect the gas detection housing 102 with the mobile computing device 112. On the other hand, the user can utilize the interconnection 114 to establish wired and/or wireless connections with the mobile computing device 112 to provide more robust gas detection capabilities, such as the high resolution screen 116 and communications circuit 120 of the mobile computing device 112.

Although the gas detection housing 102 may be capable of secured or unsecured wireless communications, various embodiments utilize the communications circuit 120 of the mobile computing device 112 to access one or more remote hosts 130, such as a server or node, across a network 132. The connection of the local controller 108 to a remote host 130 via the communications circuit 120 allows more efficient data management as data can be obtained from and stored in the remote host 130 instead of the local memory 122. Hence, the online connectivity provided by the mobile computing device 112 provides additional computing, data storage, and data collection capabilities to the gas detection housing 102 with increasing the size or complexity of the gas detection housing 102.

It is noted that any variety of hardware combinations can be incorporated into the gas detection housing 102. However, increased amounts of hardware components can make the gas detection housing 102 physically larger, power hungry, and more electrically sensitive to traumatic events like being dropped. Thus, the ability to parasitically piggyback the capabilities of the mobile computing device 112 allows the gas detection housing 102 to be physically smaller, less complex, and more protected against environmental hazards compared to a gas detection device with some, or all, of the computing capabilities of the mobile computing device 112.

Figure 2:
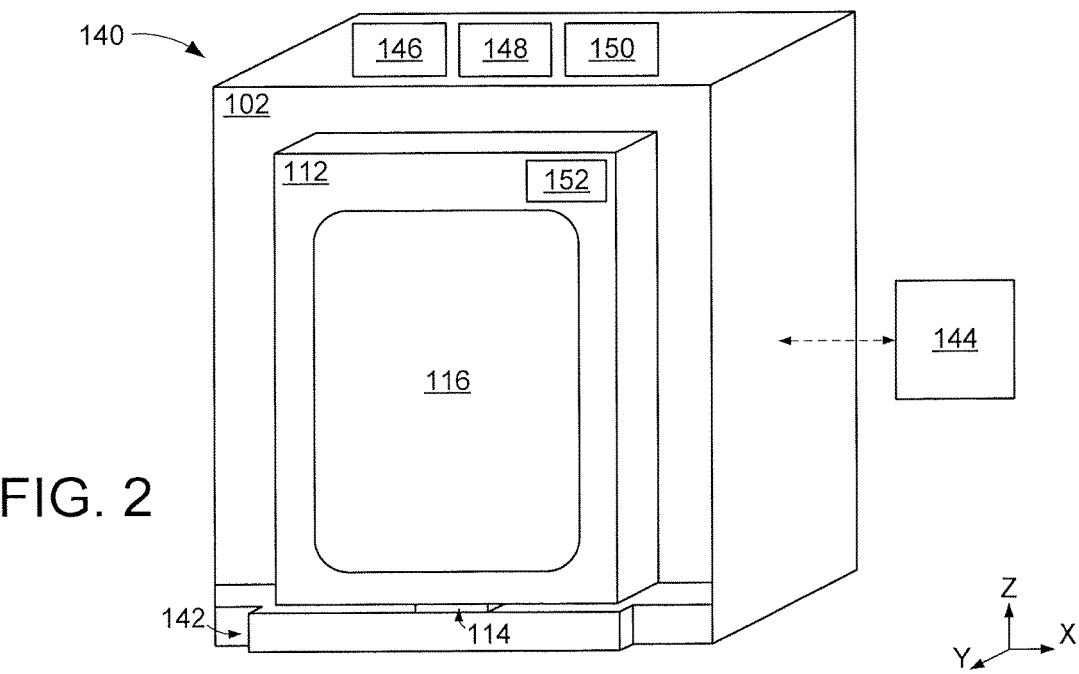
FIG. 2 shows a line representation of an example gas detection device capable of being used in the gas detection system of FIG. 1.

FIG. 2 illustrates a line representation of an example gas detection device 140 configured in accordance with assorted embodiments to allow efficient parasitic interconnection of a mobile computing device 112 with a gas detection housing 102. The line representation displays how the mobile computing device 112 can be partially, or completely, nested within a portion of the housing 102. In other words, the housing 102 can be shaped to promote and maintain secure physical engagement of the mobile computing device 112. Such physical connection may utilize a notch, groove, depression, or tab that has retention promoting material, such as hook-and-loop fasteners, magnets, and non-slip coatings.

The mobile computing device 112, in some embodiments, is sealed, or unsealed, within the gas detection housing 102 with the screen 116 being visible through a window. The electrical attachment of the mobile computing device 112 can be facilitated with one or more plugs or cables extending from an attachment protrusion 142. Additional cables, such as a headphone cable, may additionally extend from the mobile computing device. While cables and wires can connect a user to the mobile computing device 112, various embodiments configure the mobile computing device 112 to concurrently connect with the gas detection housing 102 and a wireless communication module 144, such as an encrypted wireless receiver, headphone, microphone, or other remote device.

The gas detection housing 102 can be configured with any number and type of external facing sensors 146 that can be operated independently and concurrently by local and remote controllers. As a non-limiting example, a fan sensor 146 can measure wind speed while a temperature sensor 148 can detect air temperature and a gyroscope sensor 150 can measure movement of the gas detection device 140. The gas housing 102 sensors can be complemented by one or more sensors 152 of the mobile computing device, such as optical and geopositional sensors. The ability to utilize multiple different sensors can collect redundant and complementary environmental, operational, and situational data. The position of sensors for the gas detection device 140 are not limited to an external facing location.

Figure 3:
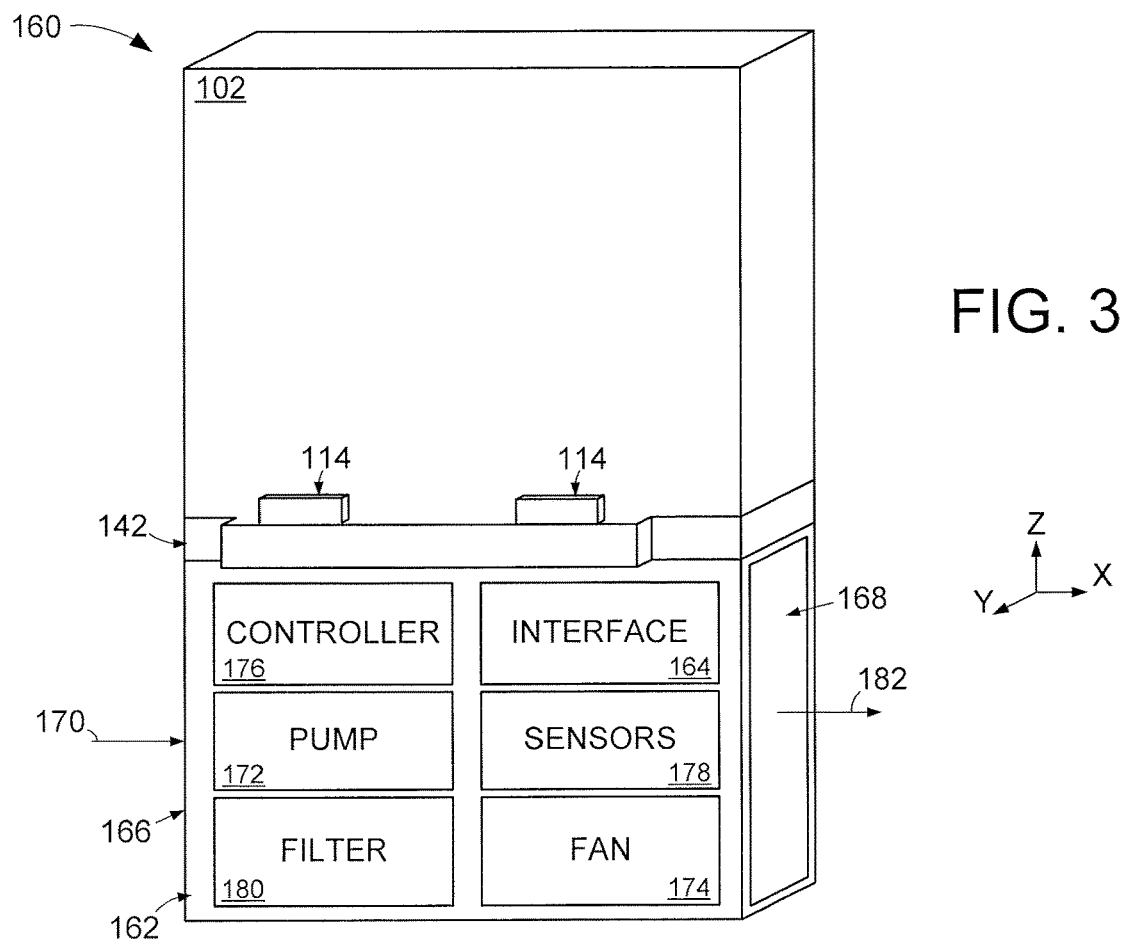
FIG. 3 illustrates a line representation of an example gas detection device constructed and operated in accordance with assorted embodiments.

FIG. 3 displays a line representation of an example gas detection device 160 configured with an internal chamber 162 that allows for internal sensing of gases. The internal chamber 162 can be integrated into the gas detection housing 102 or be an attachment to the gas detection housing 102 that electronically and physically connect to the housing 102 via an interface 164. One or more cables or plugs that extend from the attachment protrusion 142 may facilitate such attachment. It is contemplated that the internal chamber 162 is not physically in contact with the gas detection housing 102, but in electrical contact via one or more wired or wireless interconnections.

The internal chamber 162 may be sealed by one or more gaskets positioned about an inlet 166 and/or an outlet 168. The inlet 166 can be arranged to accept gas 170. The gas housing 102 or the internal chamber 162 can have a pump 172 and/or fan 174 to draw the gas 170 through the internal chamber 162. A chamber controller 176 can be located in the internal chamber 162 and configured to direct flow into and out of the internal chamber 162. In some embodiments, the chamber controller 176 draws gas 170 into the internal chamber 172 before sealing the chamber 162 by activating one or more valves. The chamber controller 176 may further direct one or more sensors 178 to process a collected sample to detect the presence and amount of constituent gases in the sample.

At least one filter 180 may be positioned in the internal chamber 162 and selectively engaged by the chamber controller 176 to alter the incoming sample. The use of one or more filters 180 can change and/or separate a sample to allow the sensor(s) 178 to accurately measure individual gases in the sample. Although not limiting, the internal chamber 162 can have any number and type of sensors 178, such as infrared and pellistor sensors, which can be activated before, during, and after sample filtering. The activation of the sensor 178 may, in various embodiments, alter the sample output 182 compared to the sample inlet.

The chamber controller 176 can continuously monitor the flow and measurement of gas through the internal chamber 162. In the event of an occlusion in the internal chamber 162, the chamber controller 176 can execute a variety of different occlusion removing procedures. For example, the pump 172 or fan 174 can reverse flow, increase flow, or decrease flow within the internal chamber 162 to dislocate an occlusion. Alternatively, the chamber controller 176 can alert a local or remote host that an error needs attention.

Figure 4:
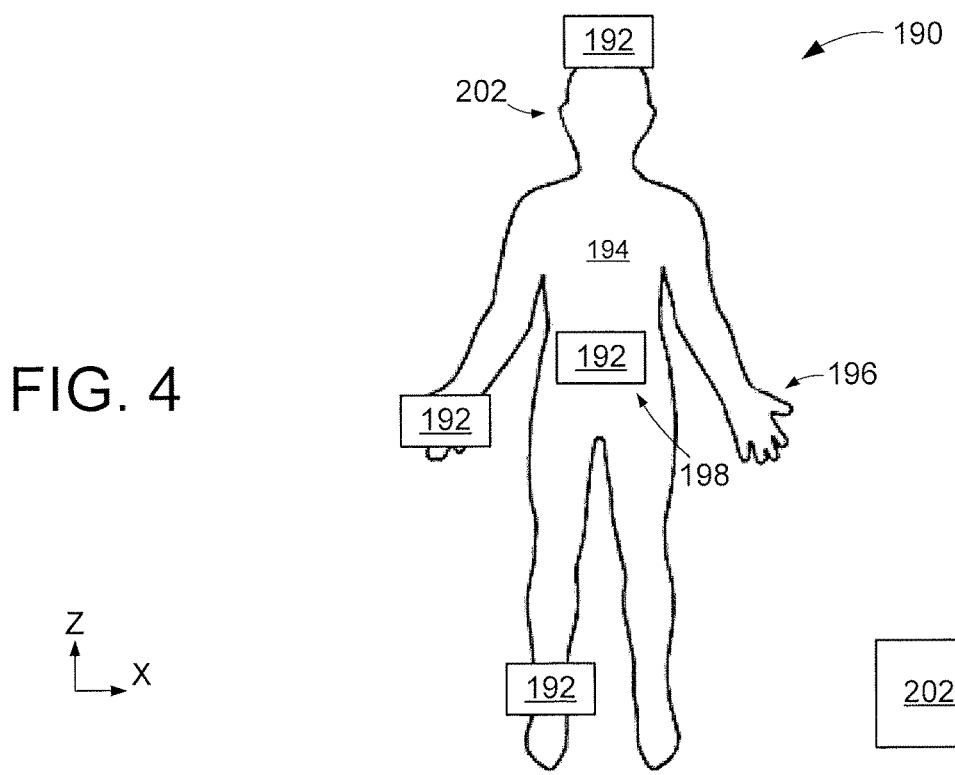
FIG. 4 depicts a line representation of an example gas detection system arranged in accordance with various embodiments.

FIG. 4 is a line representation of an example gas detection system 190 constructed and operated in accordance with various embodiments. The gas detection system 190 consists of a gas detection housing attached to a mobile computing device as a collective gas detection device 192. The gas detection device 192 can be worn and/or positioned in a variety of different locations with respect to a user 194. As shown, the gas detection device 192 can be held in the hand 196 of the user 194, attached to the waist 198 of the user 194, worn on the ankle/foot of the user 194, or positioned on the head 200 of the user 194. The gas detection device 192 can be temporarily or permanently attached to a fastener, such as a buckle or clip, to allow selective attachment and removal from different locations on the user's 194 body.

Regardless of where the user 194 positions the gas detection device 192, a secondary gas detection module 202 can be connected to the gas detection device 192 via a wired or wireless connection to provide supplemental gas detection readings and capabilities. The secondary gas detection module 202 may be a gas detection housing with an individual controller, power source, sensor, and computing device. The secondary gas detection module 202 can provide redundant and complementary gas and or environmental readings that can increase the accuracy and efficiency of gas detection.

Figure 5:
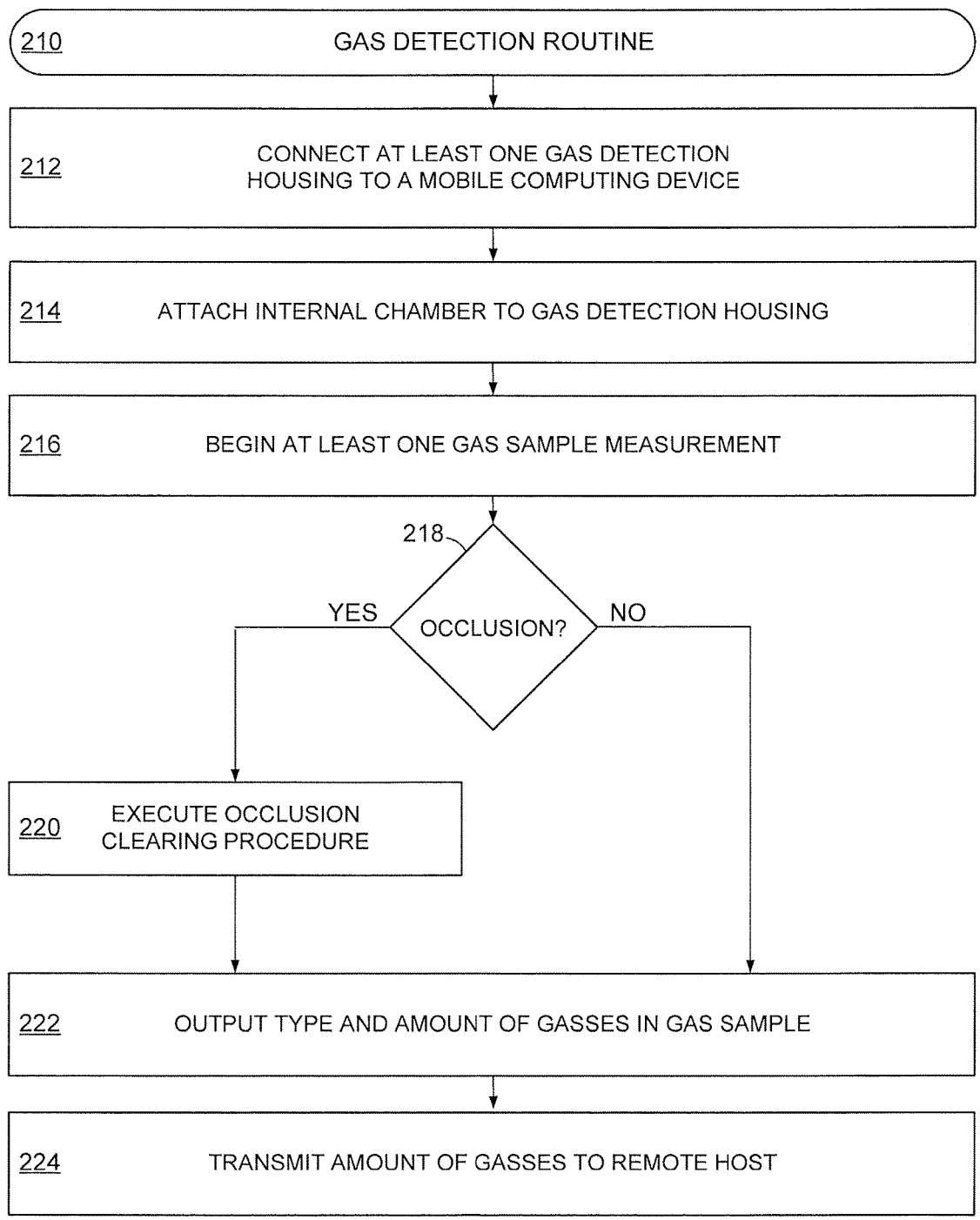
FIG. 5 is a flowchart of an example gas detection routine that is carried out in accordance with some embodiments.

FIG. 5 is a flowchart of an example gas detection routine 210 that is executed in accordance with assorted embodiments to continuously, sporadically, or randomly measure the presence and quantity of chemicals in a gas sample. The routine 210 begins with step 212 connecting a mobile computing device to a gas detection housing. The connection may be wired or wireless and may consist of more than one computing device that has a separate power source, controller, and sensor.

While gas detection may be conducted with sensors in the gas detection housing and mobile computing device, step 214 attaches an internal chamber to the gas detection housing. The internal chamber may have an independent controller and power source or may utilize the processing and power of the gas detection housing and/or mobile computing device. The ability to use an internal chamber with, or without, a chamber controller allows the gas detection housing to parasitically utilize software and hardware capabilities of the mobile computing device and internal chamber to optimize the speed and accuracy of constituent gases in a gas sample.

Step 216 then begins to take at least one gas measurement, which may concurrently involve measuring environmental conditions. The gas measurement of step 216 can statically and dynamically measure the presence and quantity of gases in a gas sample. With dynamic gas flow, an occlusion can occur in or around a sensor. Decision 218 evaluates if an occlusion has occurred. If an occlusion is present, step 220 executes one or more clearing procedures, which can be directed by a local controller, remote controller, or chamber controller. It is contemplated that the mobile computing device can be utilized to predict if and when an occlusion will occur and direct prevention activities to mitigate the risk of an occlusion affecting the speed and accuracy of gas measurement.

At the end of step 220, or if no occlusion occurs, step 222 outputs the types and amounts of gases in a gas sample. The output may be provided via the mobile computing device, the gas detection housing, or by a remote host. For instance, the output may be audible or visual and may utilize a speaker and/or screen of the mobile computing device to communicate the type and amount of gasses in the gas sample. The detected gas types and amounts found in step 216 can be continuously or periodically transmitted to one or more remote hosts in step 224 via wired or wireless communications means, such as Wi-Fi, cellular, and other broadband protocol.

It is noted that the various aspects of routine 210 are merely exemplary and are in no way required or limiting. As such, steps and decisions can be added just as the existing aspects can be changed and removed. For example, the mobile computing device may be removed from the gas detection housing prior to performing gas detection measurements solely with the gas detection housing. As another non-limiting example, an additional step may be executed to verify the readings outputted in step 222 or detect if conditions have changed that necessitate additional, more intensive, gas evaluation.

Through the selective utilization of one or more mobile computing devices, a gas detection housing can parasitically increase computing power, power supply, and memory while adding capabilities that increase gas measurement accuracy and speed. The ability to utilize an internal chamber allows a gas detection device to conduct sophisticated gas measurements that can be transmitted via wireless communications means resident in the mobile computing device. The ability to utilize a mobile computing device can further provide safety for a user. For example, the mobile computing device may continuously monitor the respiration and/or temperature of a user while detecting and measuring the constituent type and amount of gasses in a gas sample. As another non-limiting example, the mobile computing device may require a user to periodically execute commands or actions to verify the user is awake and alert during gas detection or wirelessly alert staff or personal as to adverse condition with and around a user.

It should be noted while the embodiments have been directed to gas detection, the claimed embodiments can readily be utilized in any number of other applications, such as in hazardous environments. Furthermore, it is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the technology to the full extent indicated by the broad general meaning of the terms in which the appended claims are expressed.

What is claimed is:

1. An apparatus comprising:
    a gas detection housing having a local controller and at least one housing sensor;
    a mobile computing device physically and electrically connected to the gas detection housing, the mobile computing device comprising a remote controller, remote memory, first sensor, second sensor, and communications circuit; and
    an internal chamber attached to the gas detection housing, the internal chamber comprising a chamber controller and at least one chamber sensor, the local controller utilizing the remote and chamber controllers to detect first and second gasses in a gas sample collected in the internal chamber.

2. The apparatus of claim 1, wherein the gas detection housing has a local power source.

3. The apparatus of claim 1, wherein the gas detection housing has a local memory.

4. The apparatus of claim 1, wherein the local controller utilizes a communications circuit resident in the mobile computing device.

5. The apparatus of claim 1, wherein the mobile computing device is sealed within the gas detection housing.

6. The apparatus of claim 1, wherein the internal chamber comprises a pump directing gas flow from an inlet of the internal chamber to an outlet of the internal chamber.

7. The apparatus of claim 1, wherein the internal chamber comprises a filter between the inlet and outlet.

8. The apparatus of claim 1, wherein the mobile computing device is attached to the gas detection housing via a plug extending from a protrusion.

9. A system comprising a gas detection housing physically and electrically connected to each of a mobile computing device and an internal chamber, the internal chamber configured to utilize a housing sensor of the gas detection housing and a chamber sensor of the internal chamber to detect different first and second gasses in a gas sample collected by the internal chamber, the gas detection housing comprises a local controller, the mobile computing device comprises a remote controller, remote memory, first sensor, second sensor, and communications circuit, and the internal chamber comprises a chamber controller, the local controller utilizing the remote controller and chamber controller to detect the different first and second gasses in a gas sample.

10. The system of claim 9, wherein the gas detection housing is attached to a user via a fastener.

11. The system of claim 10, wherein the fastener physically contacts a waist of the user.

12. An apparatus comprising a gas detection housing physically and electrically connected to each of a mobile computing device and an internal chamber, the mobile computing device having a first sensor and a second sensor, a local controller of the gas detection housing configured to engage a chamber controller of the internal chamber and a device controller of the mobile computing device to predict if an occlusion will occur in the internal chamber and detect different first and second gasses in a gas sample collected by the internal chamber.

13. The apparatus of claim 12, wherein the local controller utilizes a first computing device sensor of the mobile computing device, a chamber sensor of the internal chamber, and a housing sensor of the gas detection housing to detect the first and second gasses.

14. The apparatus of claim 13, wherein the device sensor, chamber sensor, and housing sensor are concurrently active.

15. The apparatus of claim 12, wherein the local controller activates a first chamber sensor of the internal chamber to detect the first and second gasses.

16. The apparatus of claim 15, wherein the first chamber sensor is an infrared sensor.

17. The apparatus of claim 15, wherein the local controller activates a second chamber sensor of the internal chamber to detect the first and second gasses.

18. The apparatus of claim 17, wherein the second chamber sensor is a pellistor sensor.

* * * * *